(12) United States Patent
Light-Holets et al.

(10) Patent No.: US 11,872,978 B2
(45) Date of Patent: Jan. 16, 2024

(54) METHOD AND SYSTEM FOR CONTROLLING A POLE SWITCH IN AN ELECTRIC MOTOR

(71) Applicants: Cummins Inc., Columbus, IN (US); Jennifer Kay Light-Holets, Greenwood, IN (US); Bradford K. Palmer, Ham Lake, MN (US)

(72) Inventors: Jennifer Kay Light-Holets, Greenwood, IN (US); Bradford K. Palmer, Ham Lake, MN (US)

(73) Assignee: CUMMINS INC., Columbus, IN (US)

( * ) Notice: Subject to any disclaimer, the term of this patent is extended or adjusted under 35 U.S.C. 154(b) by 59 days.

(21) Appl. No.: 17/627,099

(22) PCT Filed: Oct. 31, 2019

(86) PCT No.: PCT/US2019/059121
§ 371 (c)(1),
(2) Date: Jan. 13, 2022

(87) PCT Pub. No.: WO2021/086374
PCT Pub. Date: May 6, 2021

(65) Prior Publication Data
US 2022/0371572 A1    Nov. 24, 2022

(51) Int. Cl.
*B60L 15/00* (2006.01)
*B60W 10/08* (2006.01)
(Continued)

(52) U.S. Cl.
CPC .......... *B60W 10/08* (2013.01); *B60L 15/007* (2013.01); *H02K 19/12* (2013.01); *H02K 21/16* (2013.01); *B60L 2220/56* (2013.01)

(58) Field of Classification Search
CPC ... B60W 10/08; B60L 15/007; B60L 2220/56; B60L 2220/54; B60L 2240/12;
(Continued)

(56) References Cited

U.S. PATENT DOCUMENTS 6,008,616 A * 12/1999 Nagayama ............ B60L 15/025
                                                                318/773
6,788,021 B2    9/2004 Sozer et al.
(Continued)

FOREIGN PATENT DOCUMENTS

GB    2444296 A    6/2008
JP    2012029461 A * 2/2012 .......... B60L 15/2036
(Continued)

OTHER PUBLICATIONS

International Search Report and Written Opinion received for PCT Patent Application No. PCT/US2019/059121, dated Jan. 10, 2020, 11 pages.
(Continued)

*Primary Examiner* — B M M Hannan
(74) *Attorney, Agent, or Firm* — Faegre Drinker Biddle & Reath LLP (57) ABSTRACT

An electric vehicle includes an electric motor switchable between a first mode with a first number of poles and a second mode with a second number of poles less than the first number of poles, a plurality of inverters coupled to the motor, and a control module coupled to the plurality of inverters. The control module receives current vehicle information, determines that a mode switch is required between the first and second modes of the motor based on the current vehicle information, wherein the first mode achieves higher torque than the second mode, and performs the mode switch by controlling the plurality of inverters.

16 Claims, 5 Drawing Sheets

(51) Int. Cl.
  *H02K 19/12* (2006.01)
  *H02K 21/16* (2006.01)
(58) Field of Classification Search
  CPC .... B60L 2260/26; H02K 19/12; H02K 21/16; H02K 3/28; Y02T 10/64; Y02T 10/72
  See application file for complete search history.

(56) References Cited

U.S. PATENT DOCUMENTS

| | | | |
|---|---|---|---|
| 8,104,556 B2 | 1/2012 | Kojima | |
| 8,183,814 B2 * | 5/2012 | Fuchs | H02P 25/20 |
| | | | 318/524 |
| 8,618,760 B2 | 12/2013 | Bosch et al. | |
| 2003/0019674 A1 * | 1/2003 | Duan | B60K 6/52 |
| | | | 903/917 |
| 2007/0120520 A1 | 5/2007 | Miyazaki | |
| 2009/0260904 A1 * | 10/2009 | Kojima | B60W 10/08 |
| | | | 180/65.21 |
| 2011/0057591 A1 | 3/2011 | Tagome | |
| 2014/0265994 A1 * | 9/2014 | Mao | H02K 17/14 |
| | | | 318/773 |
| 2014/0324248 A1 | 10/2014 | Huntzicker | |
| 2015/0224845 A1 * | 8/2015 | Anderson | B60G 17/019 |
| | | | 701/37 |
| 2016/0257221 A1 * | 9/2016 | Aiki | B60L 15/2036 |
| 2016/0301348 A1 * | 10/2016 | Mao | H02P 25/18 |
| 2017/0144650 A1 | 5/2017 | Nagamiya et al. | |
| 2017/0259846 A1 * | 9/2017 | Koseki | H02P 29/68 |
| 2017/0317633 A1 * | 11/2017 | Li | H02K 11/225 |
| 2017/0366129 A1 | 12/2017 | Hidaka et al. | |
| 2018/0170383 A1 | 6/2018 | Scania | |
| 2019/0047540 A1 * | 2/2019 | Mclean | F16H 59/52 |
| 2019/0068107 A1 * | 2/2019 | Mao | H02K 1/00 |
| 2019/0363660 A1 * | 11/2019 | Mao | H02P 27/12 |
| 2019/0379312 A1 * | 12/2019 | Sakai | H02K 21/14 |
| 2020/0067442 A1 * | 2/2020 | Zhang | H02P 25/20 |
| 2020/0112211 A1 * | 4/2020 | Hong | H02P 25/22 |

FOREIGN PATENT DOCUMENTS

| | | |
|---|---|---|
| WO | 2012030460 A2 | 3/2012 |
| WO | WO-2014145018 A2 * | 9/2014 ........... B60G 11/265 |

OTHER PUBLICATIONS

International Search Report and Written Opinion for International patent application No. PCT/US2019/059121, filed Oct. 31, 2019, dated Jan. 10, 2020.

* cited by examiner

METHOD AND SYSTEM FOR CONTROLLING A POLE SWITCH IN AN ELECTRIC MOTOR

CROSS-REFERENCE TO RELATED APPLICATIONS

This application is a national phase application of International Application No. PCT/US2019/059121, filed on Oct. 31, 2019, which is incorporated herein by reference in its entirety.

FIELD OF THE DISCLOSURE

The present disclosure relates generally to electric vehicles, especially to controlling pole switches of electric motors used in electric vehicles.

BACKGROUND OF THE DISCLOSURE

Electric motors are used in many applications, such as electric vehicles which use pole changing motors to drive the vehicle. A pole changing motor, also known as a Dahlander motor or a dual-speed motor, varies the speed of the motor by altering the number of poles, thereby also varying the torque provided by the motor. When there is a greater number of poles, the torque is also greater, thus resulting in a higher output power provided by the motor. Generally, the synchronous speed of the motor is determined by the power supply frequency and the number of poles in the motor winding, where the speed is directly related to the frequency and inversely related to the number of poles.

The pole changing motors are known for their power efficiency because there is less power loss as compared to other speed control systems like variable frequency drives due to most of the power being used to drive the motor with no electrical pulse switching being done. However, a downside of the pole changing motors is that the mechanical components experience faster wear and tear after frequently changing between different pole numbers. Also, high harmonic distortion is experienced during the shifting of poles, which may result in a reduction in the peak currents, heating, emissions, and core loss in motors.

In view of the above examples, there is a need for a system that can better control the operation of a pole changing motor such that the motor is operated in a way that optimizes fuel economy, performance, emissions, and component life of the electric vehicle.

SUMMARY OF THE DISCLOSURE

Various embodiments of the present disclosure relate to systems and methods regarding an electric vehicle which includes an electric motor switchable between a first mode with a first number of poles and a second mode with a second number of poles less than the first number of poles, a plurality of inverters coupled to the motor, and a control module coupled to the plurality of inverters. The control module receives current vehicle information, determines that a mode switch is required between the first and second modes of the motor based on the current vehicle information, wherein the first mode achieves higher torque than the second mode, and performs the mode switch by controlling the plurality of inverters.

In one example, the current vehicle information includes one or more of: current motor mode, current load, and current vehicle speed. In another example, the control module further receives lookahead information and determines that the mode switch is required based on the current vehicle information and the lookahead information. In one aspect of this example, the lookahead information includes predicted route information. Furthermore, in another aspect of this example, the predicted route information includes one or more of: terrain information, road condition information, and traffic information. In one example, the control module is further configured to receive historical information and determine that the mode switch is required based on the historical information. In one aspect of this example, the historical information includes driving pattern information.

Also disclosed herein is a method in an electric vehicle with an electric motor switchable between a first mode with a first number of poles and a second mode with a second number of poles less than the first number of poles, a plurality of inverters coupled to the motor, and a control module coupled to the plurality of inverters. The method includes receiving current vehicle information by the control module, determining that a mode switch is required between the first and second modes of the motor by the control module based on the current vehicle information, the first mode achieving higher torque than the second mode, and performing the mode switch by the control module by controlling the plurality of inverters. In one example, the current vehicle information includes one or more of: current motor mode, current load, and current vehicle speed. In one aspect of the example, the method also includes receiving lookahead information by the control module and the control module determines that the mode switch is required based on the current vehicle information and the lookahead information. In another aspect of the example, the lookahead information includes one or more of: terrain information, road condition information, and traffic information. In one example, determining that the mode switch is required includes determining that the motor is currently in the first mode by the control module, measuring a current speed of the vehicle by at least one sensor coupled to the motor, and determining that the mode switch from the first mode to the second mode is required by the control module in response to the current speed increasing to be greater than a threshold speed. In one example, determining that the mode switch is required includes determining that the motor is currently in the second mode by the control module, measuring a current speed of the vehicle by at least one sensor coupled to the motor, and determining that the mode switch from the second mode to the first mode is required by the control module in response to the current speed decreasing to be less than a threshold speed. In one aspect of the example, the threshold speed is variable based on a current vehicle load or mass. In one example, the method further comprising performing the mode switch by the control module in response to a user input selecting a towing mode for the vehicle.

Also disclosed herein is an electric vehicle system that includes an electric vehicle. The electric vehicle includes an electric motor switchable between a first mode with a first number of poles and a second mode with a second number of poles less than the first number of poles, a plurality of inverters coupled to the motor, and a control module coupled to the plurality of inverters, the control module configured to perform the mode switch by controlling the plurality of inverters. The electric vehicle system also includes a transportation management system coupled to the control module of the electric vehicle. The transportation management system receives current vehicle information and lookahead information, determine that a mode switch is required between the first and second modes of the motor based on the current vehicle information and the lookahead information, the first mode achieving higher torque than the second mode and instructs the control module to perform the mode switch. In one example, the transportation management system includes a mapping application and an optimization module.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Figure 1:
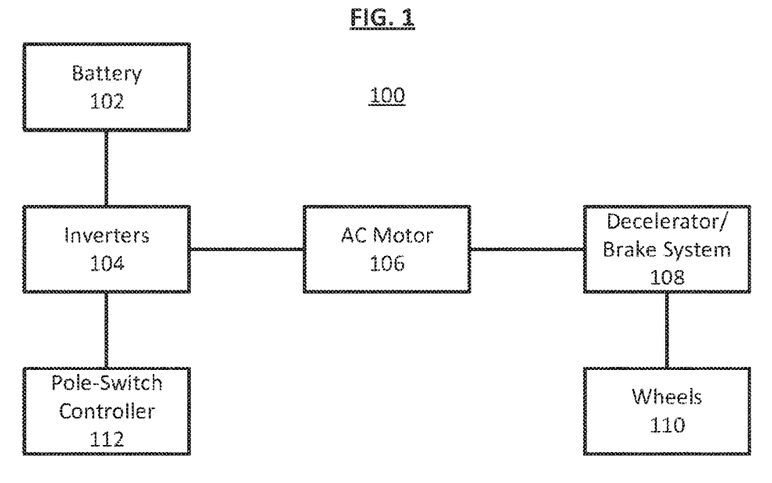
FIG. 1 is a block diagram of an electric vehicle according to one embodiment.

As shown in FIG. 1, an electric vehicle 100 includes at least one energy storage device, a set of inverters 104, an alternating current (AC) motor 106, a decelerator or a braking system 108, and a set of wheels 110, according to one embodiment. In the example shown, the energy storage device is a battery 102, although in other examples, different types of energy storage such as fuel cell, capacitor, or flywheel may be implemented as well. The inverters 104 are controlled using a pole-switch controller 112, which controls whether or not the inverters 104 are functioning synchronous with each other or if there is a delay between the inverters 104, which is further explained below. The battery 102 may be any suitable battery including but not limited to lead acid batteries, nickel metal hydride batteries, and lithium ion batteries, etc. The AC motor 106 is an induction motor, also known as asynchronous motor. The decelerator 108 may be a friction brake system which uses brake pads to produce friction with the brake rotors to slow down or stop the vehicle, or it may be a regenerative braking system which recaptures the vehicle's kinetic energy and converts it into electricity to recharge the battery 102.

Figure 2:
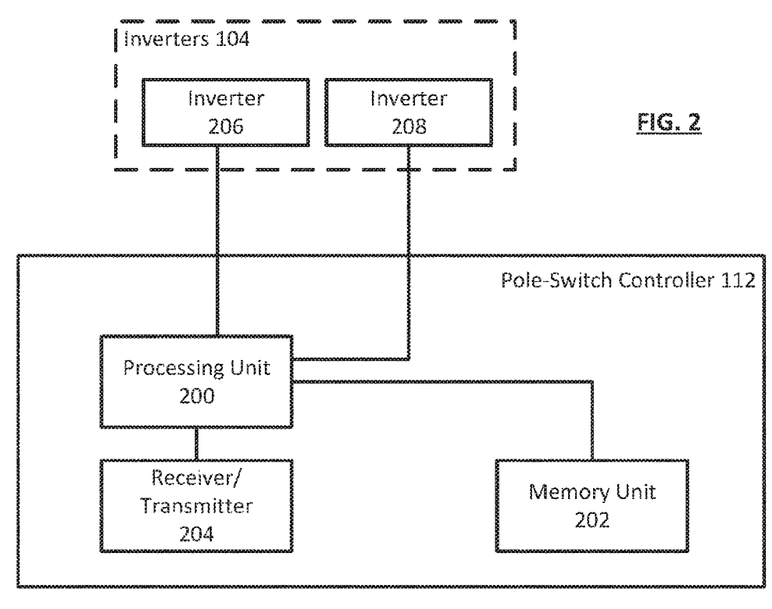
FIG. 2 is a block diagram of the pole-switch controller in the electric vehicle of FIG. 1 according to one embodiment.

FIG. 2 shows an example of the components within the pole-switch controller 112 according to one embodiment. The controller 112 includes a processing unit 200 which is coupled to both a memory unit 202 and a receiver/transmitter 204. The processing unit 200 is also coupled to the inverters 104 and it is the processing unit 200 which essentially provides the electrical signals to the inverters 104 instructing the inverters 104 to function in certain ways. In some examples, the processing unit 200 can be any suitable processor such as a system-on-chip, central processing unit (CPU), or the like, and includes a control module that makes decisions regarding whether to switch poles in the motor 106. The memory unit 202 can be any suitable memory such as static or dynamic random access memory (SRAM or DRAM), flash memory, or the like. The receiver/transmitter 204 can be any suitable digital communication module to enable access to external devices. In some examples, the receiver/transmitter 204 is capable of receiving and transmitting data wirelessly with external devices via the Internet and/or Intranet, or the like. Furthermore, in some examples, the digital communication is performed using the Internet, local area network (LAN), controller area network (CAN) bus, cloud network, or any other suitable means as known in the art. The transmitter can send instructions to external devices to transmit data back to the controller 112, and the receiver can receive the transmitted data from the external devices and send them to the processing unit 200. The data received is then used by the processing unit 200 to analyze whether the motor 106 should operate at a higher or lower pole number based on the preferred performance level of the vehicle 100. In some examples, the inverters 104 include two inverters 206 and 208, where the operation of each inverter is controlled by the processing unit 200. Specifically, the processing unit 200 is capable of controlling the delay between the first inverter 206 and the second inverter 208 to change the number of poles in the motor 106, as explained below.

Figure 3:
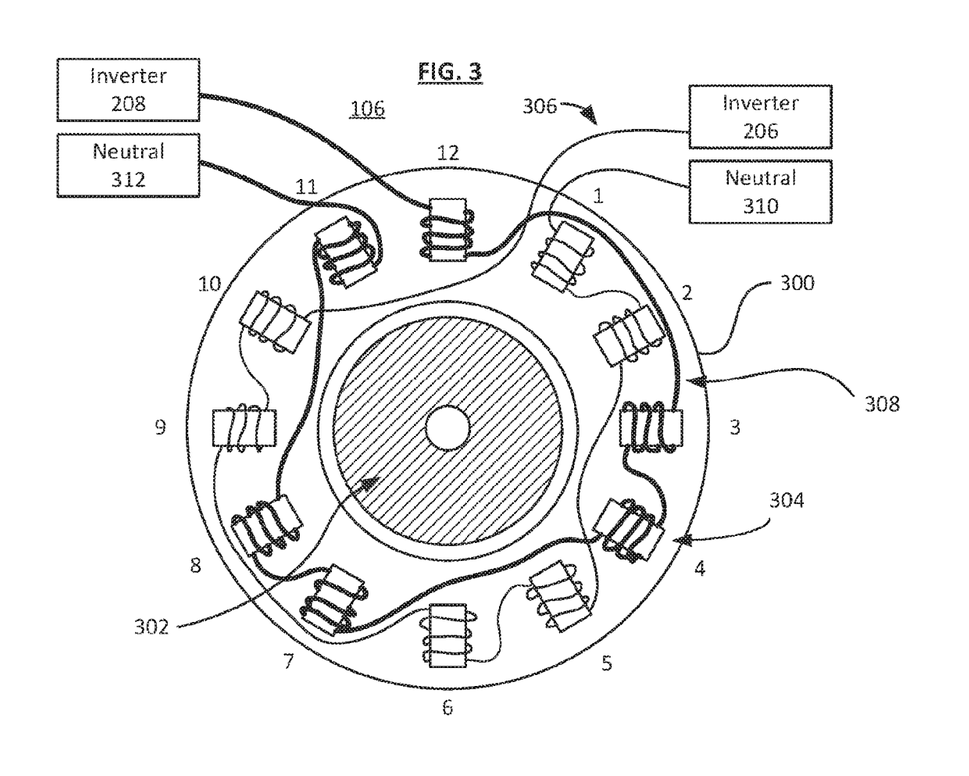
FIG. 3 is a schematic diagram of the AC motor in the electric vehicle of FIG. 1 according to one embodiment.

FIG. 3 shows a wiring example in the AC motor 106 according to an embodiment. The motor 106 includes a stator 300, which is the stationary electrical component, and a rotor 302, which is the rotating component located inside the stator 300. The stator 300 defines a set of electromagnets 304, which are numbered from 1 through 12 in the example shown in FIG. 3 in the positions resembling those of the numbers on a clock, that are formed by wrapping a wire 306 or 308 around a section of the stator 300 and activated in the presence of a rotating magnetic field. The electromagnets 1, 2, 5, 6, 9, and 10 are connected to each other by the first wire 306. The electromagnets 3, 4, 7, 8, 11, and 12 are connected to each other by the second wire 308 (shown as a bold line in FIG. 3 to distinguish from the first wire 306). The first wire 306 is connected to the first inverter 206 on one end and a neutral 310 on the other, and the second wire 308 is connected to the second inverter 208 on one end and a neutral 312 on the other. As such, each electromagnet is coupled with a neighboring electromagnet.

Figure 4A:
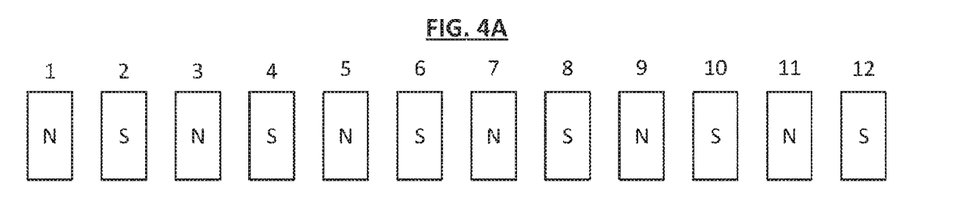
FIGS. 4A and 4B are illustrations of possible pole positions in the AC motor in the electric vehicle of FIG. 1 according to one embodiment.
Figure 4B:
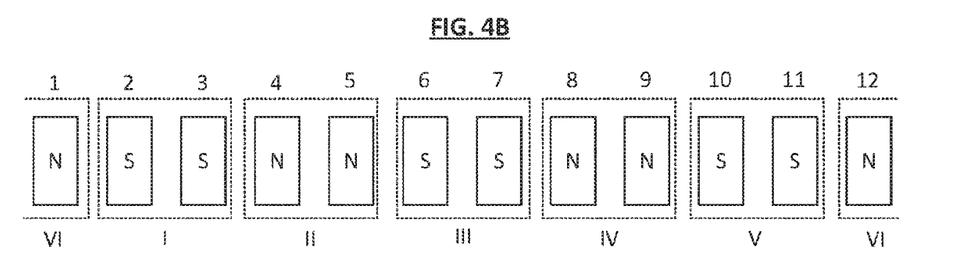

FIG. 4A shows the polarity of each electromagnets 1 through 12 in one state according to an embodiment, while FIG. 4B shows the polarity of the same electromagnets in another state according to the same embodiment. The state in FIG. 4A occurs when the first inverter 206 is operating in synchronization with the second inverter 208, therefore the two inverters are controlled such that the polarity of each electromagnet is the opposite of its neighbors. As such, the alternating polarities (N-S-N-S- . . . ) allows for each electromagnet to act as an individual pole supplying either the N pole or the S pole for the motor 106, providing a total of twelve (12) magnetic poles by the twelve physical poles in the example shown in FIG. 4A.

The state in FIG. 4B occurs when the second inverter 206 has a 180-degree delay with respect to the first inverter 204 (or vice versa, which would result in the same relative delay between the two inverters 204 and 206), therefore resulting in the electromagnets 3, 4, 7, 8, 11, and 12 associated with the second inverter 206 to reverse their polarities, causing each electromagnet to have one neighboring electromagnet with the same polarity and the other neighboring electromagnet with a different polarity. As such, each pair of neighboring physical poles with the same polarity (e.g., electromagnet pairs 2-3, 4-5, 6-7, 8-9, 10-11, and 12-1 in FIG. 4B) operates as a single magnetic pole (e.g., poles I, II, III, IV, V, and VI, respectively), thus providing a total of six (6) magnetic poles using the twelve physical poles in the example shown in FIG. 4B. Therefore, the motor 106 has twelve magnetic poles when operating in the mode of FIG. 4A but only has six magnetic poles when operating in the mode of FIG. 4B, even though both operate using twelve physical poles. The difference in the number of poles affects the torque of the electric vehicle 100. By halving the number of poles in FIG. 4B, the pole pitch is doubled as well as the synchronous speed, but the torque is halved while the shaft-power at rest is almost the same.

Figure 5:
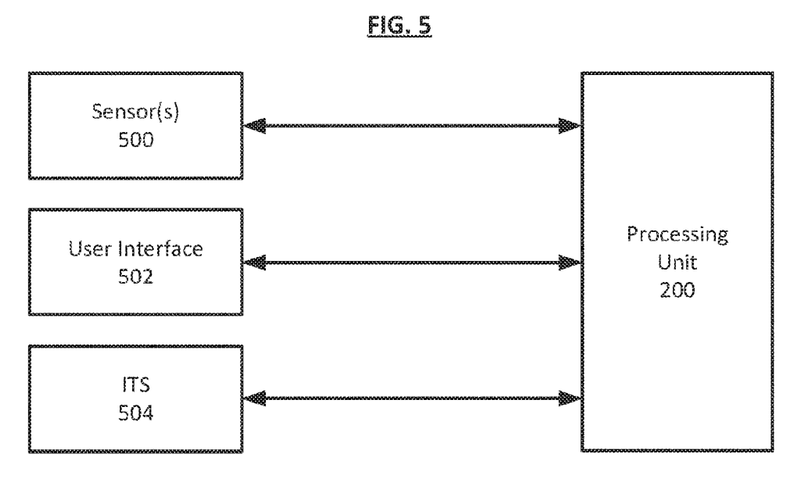
FIG. 5 is a block diagram of an electric vehicle control system according to one embodiment.

FIG. 5 shows an example of the different components that the processing unit 200 has access to according to one embodiment. For example, the processing unit 200 accesses one or more sensor(s) 500 associated with different components within the electric vehicle 100 to determine whether to induce the 180-degree delay in one of the inverters 204, 206 as shown above, by receiving measurement data from the sensor(s) 500. In some examples, the sensor 500 measures a vehicle load or mass, such as the number of passengers or the total weight of the loads on the vehicle. In some examples, the transmission gear ratios are recorded and the sensor 500 senses which transmission gear, e.g. tall gear or short gear, is currently being used. In some examples, the sensor 500 is a speedometer that measures speed or velocity of the electric vehicle 100. In some examples, the sensor 500 is an ammeter that measures a ground fault current, or leakage current, in case of an inadvertent contact between the energized conductor and ground or vehicle frame. In some examples, the sensor 500 is a thermistor that measures the temperature of the vehicle 100, or more specifically the battery 102 of the vehicle 100. In some examples, the sensor 500 is a gyroscope that measures the angular velocity of the vehicle 100 to maintain the orientation thereof to conserve momentum. Other types of sensors typically found in an electric vehicle, such as position sensors including but not limited to rotary position sensors and angle position sensors, battery monitoring sensors that measure the health and state of charge of the battery 102, tire pressure sensors, and other MEMS (microelectromechanical system)-based sensors.

In some examples, the processing unit 200 is coupled to a user interface 502 to receive specific instructions from the user regarding the state of the electric vehicle 100. For example, a user may need to use the vehicle 100 to tow another vehicle from one place to another. In this case, the user may select "towing mode" on the user interface 502, which sends instructions to the processing unit 200 that the vehicle 100 needs more torque to perform the towing. As such, in response to this user input, the processing unit 200 observes the number of magnetic poles that are currently in the motor 106 and, if there are twelve magnetic poles, the processing unit 200 takes no action, but if there are only six magnetic poles (i.e., there is the 180-degree delay in one of the inverters 206, 208 with respect to the other inverter), the processing unit 200 eliminates the 180-degree delay by implementing an additional 180-degree delay to the already-delayed inverter, for example, so that the inverters 204 and 206 are in synchronization with respect to each other. Furthermore, the user may undo "towing mode" after the towing is completed, in which case the processing unit 200 may then decide whether to maintain the twelve-pole mode or revert to the six-pole mode based on other factors that will be further explained below.

Another component that the processing unit 200 may have access to is an intelligent transportation system (ITS) 504 which is a transportation management system that provides information to optimize the user's driving experience. For example, the ITS 504 includes a mapping application which has data regarding grades (a.k.a. slopes or inclines) of the roads and highways within a distance from the current position of the vehicle 100 or an area or terrain surrounding the predicted route that the vehicle 100 is estimated to take, based on user input or historical data of previous travels. The mapping application can also include speed limit information and traffic information of the roads and highways that the user is predicted to travel. In some examples, the mapping application also includes potential rolling resistance that may be experienced by the wheels 110 of the vehicle 100. A rolling resistance, which depends on a coefficient of rolling friction of the surface, is the opposing force that the vehicle 100 must overcome due to the rolling motion between the wheels 110 and the surface of motion of the vehicle 100. Different road surfaces and conditions (e.g. concrete, asphalt, macadam, snow, dirt, mud, grass, and sand, etc.) have different values of such coefficient. Even with the same contact surface, the coefficient may vary considerably depending on how well-maintained the road is (poorly maintained roads would naturally have higher coefficients than well-maintained roads) or the thickness and softness of the layer of material (e.g. snow, dirt, mud, sand) covering the surface. Therefore, more torque is required if the vehicle 100 is driving on a road covered with snow or sand, for example, than if the vehicle 100 is driving on a well-maintained concrete road. In any of these examples, the mapping application is configured to find an optimal route that takes the shortest time, shortest distance, or any other parameters based on user preference as well as the current traffic and road condition information.

Combining these information, the processing unit 200 can decide the best mode of operation for the motor 106. In some examples, the transfer of information between the processing unit 200 and any of the components 500, 502, and 504, is bidirectional. That is, the processing unit 200 can send a request signal to the component 500, 502, or 504 to request the targeted component to provide information data to the processing unit 200. In some embodiments, the transfer of information is unidirectional, i.e. from the component 500, 502, or 504 to the processing unit 200 at a predetermined interval of time between each separate transfer. As explained below, the transfer may occur via wired communication or wireless communication, as appropriate.

Figure 6:
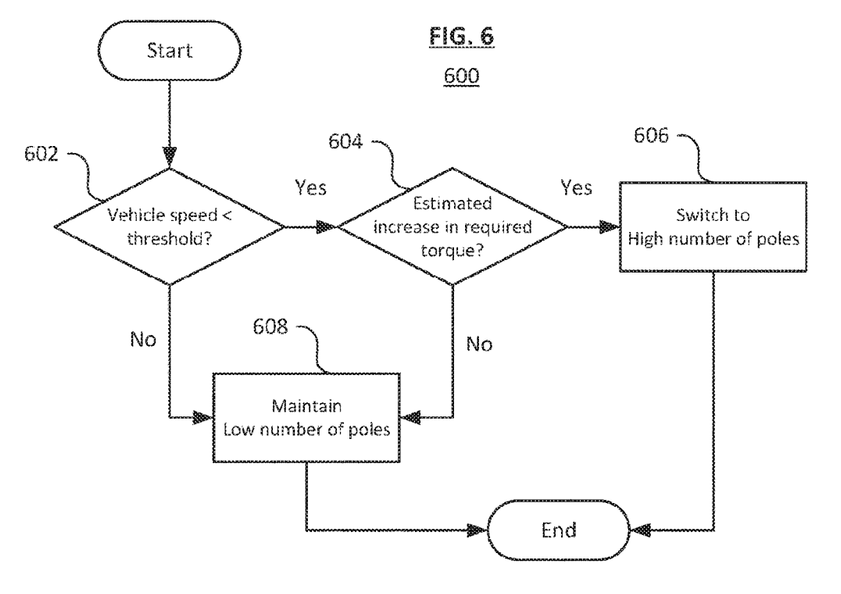
FIG. 6 is a flow diagram of a method of determining whether to switch from a mode with a lower number of poles to a mode with a higher number of poles according to one embodiment.

FIG. 6 shows an example of a method 600 that the processing unit 200 uses to determine whether the number of poles needs to be changed, according to an embodiment. In the method 600, the motor 106 is at the mode with a lower number of poles (e.g. the mode shown in FIG. 4B) at the start of the method, and the processing unit 200 decides whether to maintain the lower number of poles or switch to a higher number of poles. Specifically, in block 602, the processing unit 200 decides if the speed of the electric vehicle 100 is less than a threshold speed. In some examples, the threshold speed can be less than 20 to 30 mph. In some examples, the threshold speed is variable based on vehicle load or mass and whether a towing mode is selected for the vehicle via user input. If the answer to the block 602 is "yes", the method proceeds to block 604, where the processing unit decides if there is an estimated increase in the required torque for the vehicle 100. In some examples, the estimated increase in the required torque is caused by increased load or mass of the vehicle 100, predicted incline on the roads, the need for the vehicle 100 to tow another vehicle, or other suitable conditions in which a high torque is desirable. If the answer to the block 604 is "yes", then the method proceeds to block 606 where the processing unit 200 decides to switch the mode of the motor 106 to a higher number of poles. Alternatively, if the answer to the block 602 is "no", i.e. the vehicle speed is greater than the threshold, or if the answer to the block 604 is "no", i.e. there is no estimated increase in the required torque of the vehicle 100, then in both instances, the lower number of poles is maintained, such that the motor 106 can provide less torque but is able to provide faster speed for the vehicle 100 to travel.

Figure 7:
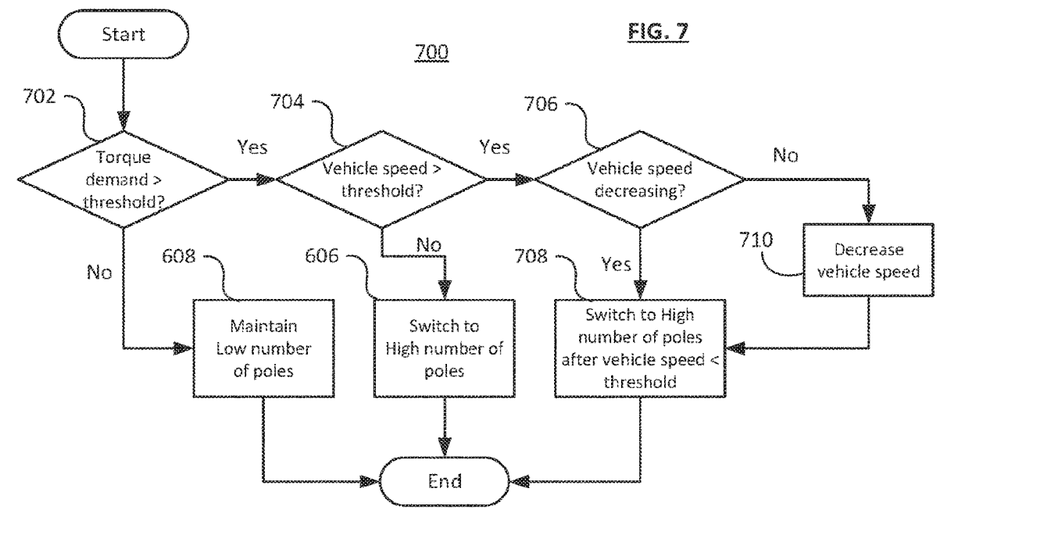
FIG. 7 is a flow diagram of a method of determining whether to switch from a mode with a lower number of poles to a mode with a higher number of poles according to one embodiment.

FIG. 7 is an example of another method 700 used to determine whether the number of poles needs to be changed, according to an embodiment. In block 702, the processing unit 200 decides if the torque demand is greater than a predetermined threshold value. If the answer to the block 702 is "no", there is no need to switch to the mode with higher number of poles, so the method proceeds to the block 608 where the lower number of poles is maintained. If the answer to the block 702 is "yes", the method proceeds to block 704, where the processing unit 200 decides if the vehicle speed is greater than the threshold speed which, as previously explained, may be less than 20 to 30 mph according to some examples. If the answer to the block 704 is "no", the processing unit 200 can switch to the mode with the higher number of poles as in the block 606. If the answer to the block 704 is "yes", the method proceeds to block 706, where the processing unit 200 decides if the vehicle speed is decreasing so that the speed of the vehicle 100 would eventually reach the threshold speed. If the answer to the block 706 is "no", the processing unit 200 can then proceed to block 710 and decreases the vehicle speed toward the threshold speed.

In one example, the processing unit 200 reduces the vehicle speed automatically and notifies the user via the user interface 502 that the vehicle speed is being reduced to activate high-torque mode. In another example, the processing unit 200 uses the user interface 502 to display a notification for the user to reduce the vehicle speed in view of the predicted torque demand. In this example, the user has the power to decide when to switch modes, which may be beneficial if the user does not wish to slow down the vehicle 100 due to various reasons such as time constraints. Either way, the processing unit 200 waits until the vehicle speed is reduced to the threshold speed before switching to the mode with the higher number of poles, as shown in block 708, which would then provide higher torque but slower speed for the vehicle 100.

Figure 8:
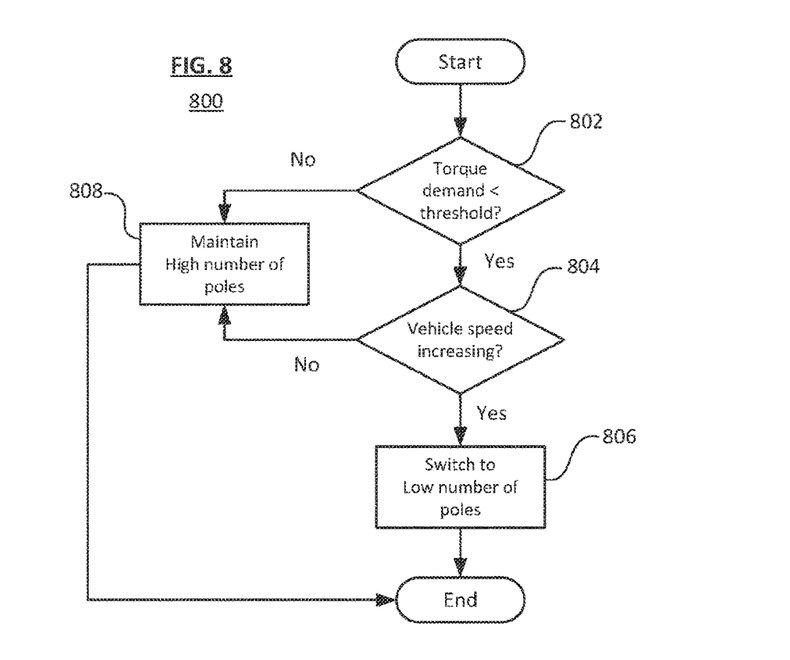
FIG. 8 is a flow diagram of a method of determining whether to switch from a mode with a higher number of poles to a mode with a lower number of poles according to one embodiment.

FIG. 8 shows another example of a method 800 used to determine whether the number of poles needs to be changed, according to an embodiment. The method 800 differs from the previously mentioned methods in that, in the methods 600 and 700 the vehicle 100 is initially in the mode with the lower number of poles, whereas in the method 800 the vehicle 100 is initially in the mode with the higher number of poles. That is, the methods 600 and 700 are applicable when the vehicle 100 is in the mode with the lower number of poles, and the method 800 is applicable when the vehicle 100 is in the mode with the higher number of poles.

Therefore, the vehicle 100 is operating in the mode that provides the highest torque at block 802, during which the processing unit 200 decides if the predicted torque demand is less than the threshold torque demand. If the answer to the block 802 is "yes", the method proceeds to block 804 in which the processing unit 200 deicides if the vehicle speed is increasing. If the answer to either of block 802 or 804 is "no", there is no need to switch the mode of the vehicle, therefore the processing unit 200 maintains the higher number of poles as in block 808. If the answer to the block 804 is "yes", the method proceeds to block 806 in which the processing unit 200 switches the mode of the vehicle to the one with the lower number of poles because there is no demand for more torque and the vehicle 100 needs the speed that can be obtained from lowering the number of poles in the motor 106. In some examples, there may be additional steps in the methods shown above that incorporate hysteresis of the system to make decisions in order to avoid or minimize toggling between modes. For example, there may be a step in which the processing unit 200 confirms when the last mode change took effect, so that the processing unit 200 can avoid changing modes too soon to reduce the risk of having a fault in the motor 106. In some examples, the processing unit 200 may also decide not to switch between modes when such fault is detected in any component of the motor 106.

Figure 9:
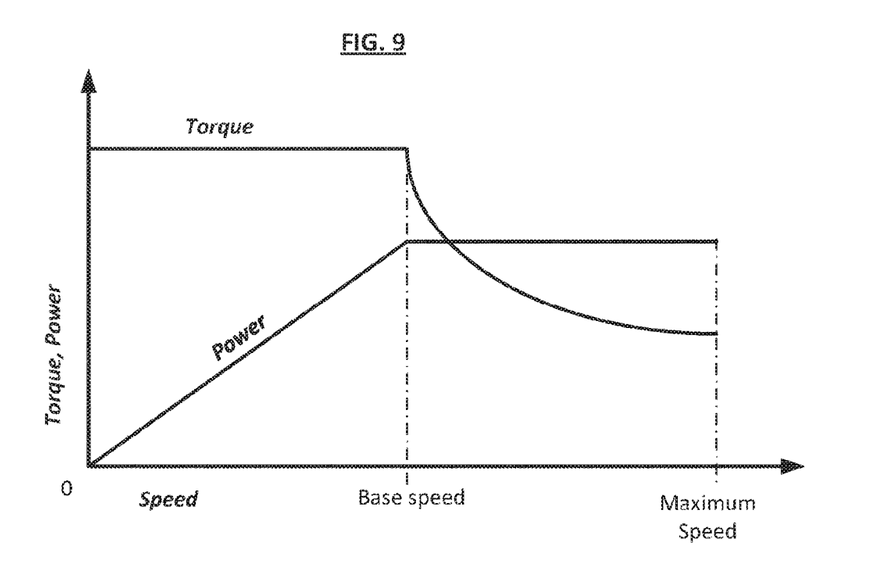
FIG. 9 is a graph showing the relationship between speed and torque/power of the vehicle according to one embodiment.

FIG. 9 shows a graph depicting the relationship between power and torque with respect to the speed of the electric vehicle 100. When the vehicle 100 is initially at rest, i.e. with zero speed and zero power, both the speed and the power can be increased by providing a constant, high torque up to the point when the vehicle 100 reaches a base speed, because it is desirable for an electric vehicle to have a high torque at low speed for starting and accelerating the motor. However, because high torque cannot be maintained at high speed, the torque gradually decreases as the speed increases, while the power remains constant after reaching the base speed. In some examples, the base speed is the same as the threshold speed, which may be less than 20 to 30 mph. Therefore, the graph is generally separated into two regions: (a) a region of constant high torque and (b) a region of constant high power. Generally, the region of constant high torque corresponds to the mode with higher number of poles, and the region of constant high power corresponds to the mode with lower number of poles.

Figure 10:
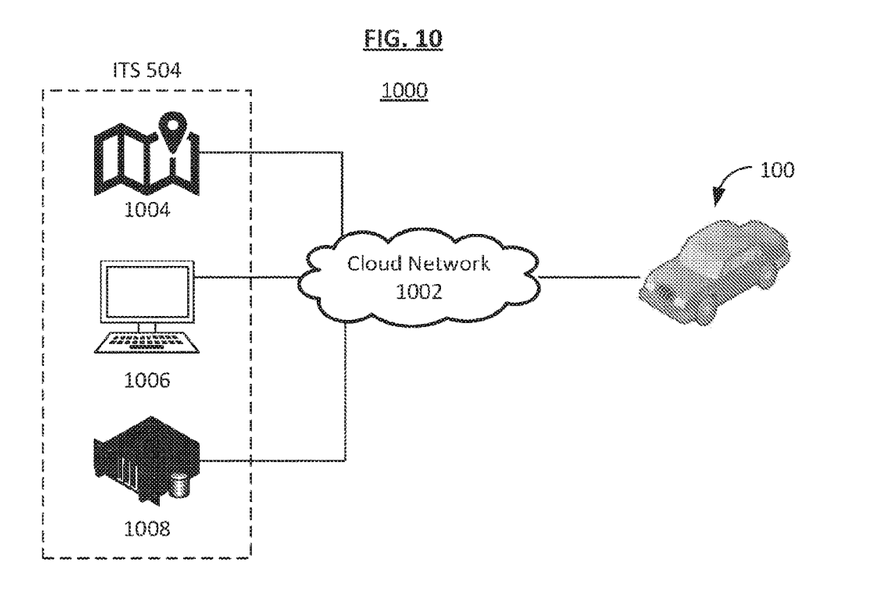
FIG. 10 is a block diagram of an electric vehicle control system using a cloud network according to one embodiment.

FIG. 10 shows an example of an electric vehicle network system 1000 according to an embodiment. The network system 1000 includes the electric vehicle 100 connected wirelessly to a cloud network 1002 which in turn allows access to the remote ITS 504. The ITS 504 in this example includes numerous terminals 1004, 1006, 1008 which provide different services in the ITS 504. For example, the first terminal 1004 may be the mapping application that is run on a remote computing device as previously explained, which provides the raw data regarding the conditions and grades of the roads, among other information. The raw data from the first terminal 1004 may be transferred via the cloud network 1002 to a second terminal 1006 which is another remote computing device that performs calculations and makes determinations regarding whether to switch between modes in the vehicle 100. In this example, the processing unit 200 in the vehicle 100 does not perform the methods 600, 700, and 800 as previously described, but rather the second terminal 1006 performs these methods. In some examples, the second terminal 1006 includes an optimization module that runs one or more optimization algorithm, such as lookahead techniques and predictive modeling, based on the information provided by the mapping application from the first terminal 1004 to aid the decision-making process. A third terminal 1008 is a remote server or database which stores data regarding the previous trips made by the vehicle 100 such that the second terminal 1006 can make decisions based not only on the current and lookahead data but also on the past historical data provided by the third terminal 1008.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. An electric vehicle comprising:
   an electric motor switchable between a first mode with a first number of poles and a second mode with a second number of poles less than the first number of poles;
   a plurality of inverters coupled to the electric motor; and
   a controller coupled to the plurality of inverters, the controller configured to:
   receive current vehicle information and lookahead information;
   determine, based on the current vehicle information and the lookahead information, that a mode switch is required between the first and second modes of the electric motor, wherein the first mode achieves higher torque than the second mode; and
   perform the mode switch by controlling operation of the plurality of inverters based on the determination that the mode switch is required, such that:
   (a) in the first mode, each physical pole in the plurality of inverters is configured to operate as a single magnetic pole, and
   (b) in the second mode, each pair of neighboring physical poles in the plurality of inverters with a same polarity is configured to operate as the single magnetic pole.

2. The electric vehicle of claim 1, wherein the current vehicle information includes one or more of: current motor mode, current load, and current vehicle speed.

3. The electric vehicle of claim 1, wherein the lookahead information includes predicted route information.

4. The electric vehicle of claim 3, wherein the predicted route information includes one or more of: terrain information, road condition information, and traffic information.

5. The electric vehicle of claim 1, wherein the controller is further configured to receive historical information and determine that the mode switch is required based on the historical information.

6. The electric vehicle of claim 5, wherein the historical information includes driving pattern information.

7. A method in an electric vehicle with an electric motor switchable between a first mode with a first number of poles and a second mode with a second number of poles less than the first number of poles, a plurality of inverters coupled to the electric motor, and a controller coupled to the plurality of inverters, the method comprising:
   receiving, by the controller, current vehicle information and lookahead information;
   determining, by the controller based on the current vehicle information and the lookahead information, that a mode switch is required between the first and second modes of the electric motor, wherein the first mode achieves higher torque than the second mode; and performing, by the controller, the mode switch by controlling operation of the plurality of inverters based on the determination that the mode switch is required, such that:
  (a) in the first mode, each physical pole in the plurality of inverters is configured to operate as a single magnetic pole, and
  (b) in the second mode, each pair of neighboring physical poles in the plurality of inverters with a same polarity is configured to operate as the single magnetic pole.

8. The method of claim 7, wherein the current vehicle information includes one or more of: current motor mode, current load, and current vehicle speed.

9. The method of claim 7, wherein the lookahead information includes one or more of: terrain information, road condition information, and traffic information.

10. The method of claim 7, wherein determining that the mode switch is required comprises:
  determining, by the controller, that the electric motor is currently in the first mode;
  measuring, by at least one sensor coupled to the electric motor, a current speed of the vehicle; and
  determining, by the controller, that the mode switch from the first mode to the second mode is required in response to the current speed increasing to be greater than a threshold speed.

11. The method of claim 10, wherein the threshold speed is variable based on a current vehicle load or mass.

12. The method of claim 7, wherein determining that the mode switch is required comprises:
  determining, by the controller, that the electric motor is currently in the second mode;
  measuring, by at least one sensor coupled to the electric motor, a current speed of the vehicle; and
  determining, by the controller, that the mode switch from the second mode to the first mode is required in response to the current speed decreasing to be less than a threshold speed.

13. The method of claim 12, wherein the threshold speed is variable based on a current vehicle load or mass.

14. The method of claim 7, further comprising performing, by the controller, the mode switch in response to a user input selecting a towing mode for the vehicle.

15. An electric vehicle system comprising:
an electric vehicle comprising:
  an electric motor switchable between a first mode with a first number of poles and a second mode with a second number of poles less than the first number of poles,
  a plurality of inverters coupled to the electric motor, and
  a controller coupled to the plurality of inverters, the controller configured to perform a mode switch by controlling operation of the plurality of inverters; and
a transportation management system coupled to the controller of the electric vehicle, the transportation management system configured to:
  receive current vehicle information and lookahead information;
  determine, based on the current vehicle information and the lookahead information, that a mode switch is required between the first and second modes of the electric motor, wherein the first mode achieves higher torque than the second mode; and
  instruct the controller to perform the mode switch based on the determination that the mode switch is required, such that:
    (a) in the first mode, each physical pole in the plurality of inverters is configured to operate as a single magnetic pole, and
    (b) in the second mode, each pair of neighboring physical poles in the plurality of inverters with a same polarity is configured to operate as the single magnetic pole.

16. The electric vehicle system of claim 15, wherein the transportation management system includes a mapping application and an optimization module.

* * * * *